Nov. 22, 1927.

W. MORRISON

BATTERY GRID

Filed Sept. 10. 1924

1,650,530

Inventor:
William Morrison,
By Byrne Townsend & Brickenstein,
Attorneys.

Patented Nov. 22, 1927.

1,650,530

UNITED STATES PATENT OFFICE.

WILLIAM MORRISON, OF CHICAGO, ILLINOIS, ASSIGNOR TO VESTA BATTERY CORPORATION, OF CHICAGO, ILLINOIS, A CORPORATION OF ILLINOIS.

BATTERY GRID.

Application filed September 10, 1924. Serial No. 736,962.

This invention relates to battery grids and has for its object the provision of a grid that is cheap to manufacture and a grid which may be filled with the active material in a shorter time than has heretofore been possible.

For a full understanding of the invention and its characteristic features reference is made to the accompanying drawings in which Fig. 1 is a perspective view of a grid embodying the invention;

Figure 1:
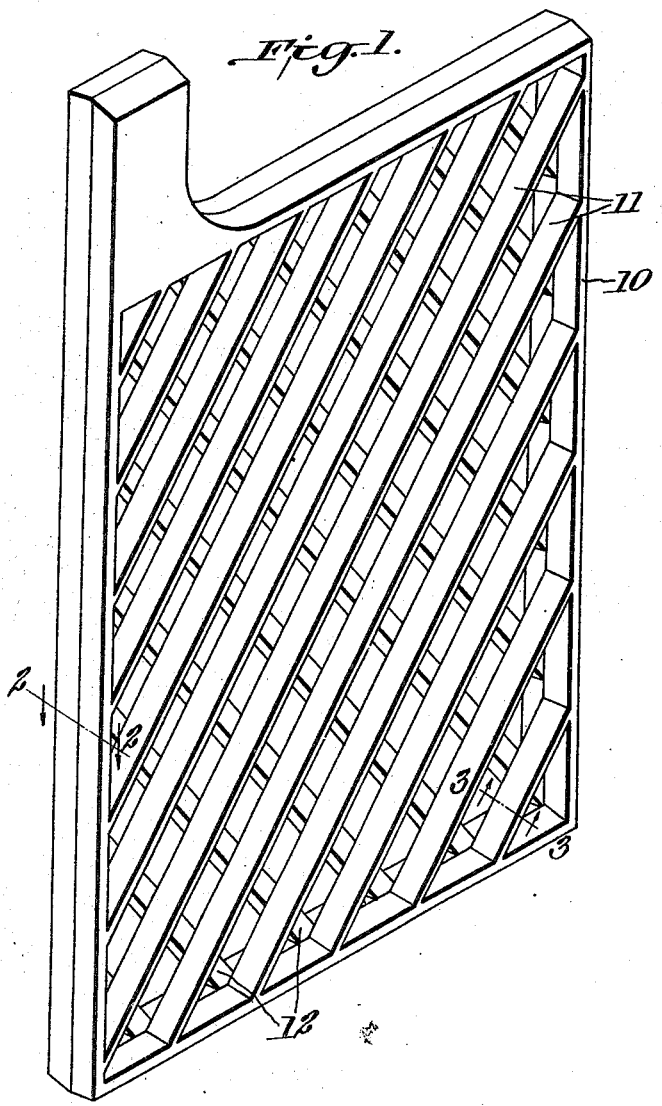
Figure 2:
Fig. 2 is a section through the frame on line 2—2 of Fig. 1.
Figure 3:
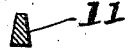
Fig. 3 is a section on line 3—3 of Fig. 1.

The grid consists of a perimetric frame 10 and ribs or cross-bars diagonally disposed within the frame. There are two sets of ribs 11 and 12 on opposite sides of the medial plane through the frame 10. The ribs of each set are substantially parallel to each other, but the ribs of one set cross the ribs of the other set to produce the usual reticulated framework for holding the active material in position.

The essential novelty in the arrangement and its practical significance are as follows:—

In molding the grid the metal freely flows down the molding spaces or grooves in which the ribs are formed and does not encounter any obstructions or cross pieces behind which air pockets may be formed. The molding grooves allow the material to flow down and at the same time allows all the air to flow up so that a perfect casting is obtained.

The filling of the grid with active material is likewise carried out in a simple and expeditious manner. The material is spread on one side and a flat board or wiper is moved over it parallel to the ribs. Since there are no cross pieces in the path of the material all the spaces between the ribs are completely filled. The other side is then filled in the same way.

In addition to these advantages, the grid is exceedingly strong as it is braced in all directions against bending forces and for this reason strains such as usually cause buckling are materially reduced.

Not only is the grid structure exceedingly strong, but this strength is coupled with a material saving of metal, since no separate strenghening ribs are necessary.

Conversely, with a certain amount of metal for the grid a maximum amount of filling space is made available for the plate.

It may be noted that all parts of the grid are beveled outwardly from the medial plane through the frame 10. Thus the ribs 11 and 12 are widest at their base and taper uniformly to the outer surface which is substantially an edge. Similarly, the frame 10 tapers outwardly from the medial plane, both on the inside and the outside. This arrangement, as is well understood, facilitates the removal of the casting from the mold which is composed of two equal sections.

I claim:—

1. A battery grid of the type having a rectangular frame, and two sets of ribs extending obliquely in said frame, each of said sets of ribs lying on opposite sides of a medial plane through the frame, characterized by the fact that all ribs on one side of said medial plane are parallel.

2. A battery grid of the type having a rectangular frame, and two sets of ribs extending obliquely in said frame, each of said sets of ribs lying on opposite sides of a medial plane, characterized by the fact that all ribs on one side of said medial plane are parallel, and all ribs on the opposite side of said plane are parallel, but at an angle to said first set.

In testimony whereof, I affix my signature.

WILLIAM MORRISON.